US008856786B2

(12) United States Patent
Kikuchi et al.

(10) Patent No.: US 8,856,786 B2
(45) Date of Patent: Oct. 7, 2014

(54) APPARATUS AND METHOD FOR MONITORING COMMUNICATION PERFORMED BY A VIRTUAL MACHINE

(75) Inventors: Shunsuke Kikuchi, Kawasaki (JP); Yuji Imai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 221 days.

(21) Appl. No.: 13/493,405

(22) Filed: Jun. 11, 2012

(65) Prior Publication Data

US 2013/0007740 A1    Jan. 3, 2013

(30) Foreign Application Priority Data

Jun. 29, 2011  (JP) .................................. 2011-143675

(51) Int. Cl.
*G06F 9/455* (2006.01)
*H04L 29/06* (2006.01)
*H04L 12/28* (2006.01)
*G06F 11/30* (2006.01)
*H04L 12/46* (2006.01)
*H04L 12/24* (2006.01)

(52) U.S. Cl.
CPC ............ *G06F 9/45558* (2013.01); *H04L 63/00* (2013.01); *H04L 12/2874* (2013.01); *G06F 11/3006* (2013.01); *H04L 63/20* (2013.01); *G06F 11/301* (2013.01); *H04L 12/4633* (2013.01); *H04L 41/0893* (2013.01); *H04L 41/5012* (2013.01); *G06F 2009/45591* (2013.01); *G06F 11/3072* (2013.01); *H04L 12/4641* (2013.01)
USPC .......................................................... 718/1

(58) Field of Classification Search
None
See application file for complete search history.

(56) References Cited

U.S. PATENT DOCUMENTS

| 7,802,000 | B1 * | 9/2010 | Huang et al. .................. 709/228 |
| 7,908,395 | B1 * | 3/2011 | Salkewicz ..................... 709/238 |
| 7,941,539 | B2 * | 5/2011 | Tripathi et al. ............... 709/226 |
| 8,429,647 | B2 * | 4/2013 | Zhou et al. ........................ 718/1 |
| 8,560,634 | B2 * | 10/2013 | Twitchell, Jr. ................ 709/217 |
| 2004/0205201 | A1 | 10/2004 | Katsube et al. |
| 2006/0143699 | A1 | 6/2006 | Nagata et al. |
| 2009/0092137 | A1 * | 4/2009 | Haigh et al. ................... 370/392 |
| 2010/0251329 | A1 * | 9/2010 | Wei .................................... 726/1 |
| 2010/0293269 | A1 * | 11/2010 | Wilson et al. ................. 709/224 |
| 2011/0022695 | A1 * | 1/2011 | Dalal et al. .................... 709/222 |
| 2011/0141881 | A1 * | 6/2011 | Joshi et al. ..................... 370/219 |
| 2011/0179136 | A1 * | 7/2011 | Twitchell, Jr. ................ 709/217 |
| 2011/0191402 | A1 * | 8/2011 | Imai .............................. 709/201 |
| 2011/0191492 | A1 * | 8/2011 | Imai .............................. 709/238 |

FOREIGN PATENT DOCUMENTS

| JP | 2003-244245 | 8/2003 |
| JP | 2004-109263 | 4/2004 |
| JP | 2004-199652 | 7/2004 |
| JP | WO 2004/071038 | 8/2004 |

* cited by examiner

*Primary Examiner* — Van Nguyen
(74) *Attorney, Agent, or Firm* — Staas & Halsey LLP

(57) ABSTRACT

An apparatus stores, in association with each of one or more services to be provided, a communication monitoring rule under which communication performed for providing the each of the one or more services is to be monitored. The apparatus communicates with another apparatus that is operable to run a virtual machine and run a virtual router relaying communication performed by the virtual machine. When a service to be provided by the virtual machine is selected from among the one or more services, the apparatus controls the virtual router to monitor communication performed by the virtual machine according to the communication monitoring rule associated with the selected service, by sending the communication monitoring rule to the virtual router.

7 Claims, 15 Drawing Sheets

FIG. 6

| CONNECTION LIST TABLE 111 | | |
|---|---|---|
| USER ID | SaaS TYPE | NETWORK IF |
| User1 | SaaS1 | IF-S1 |
| User1 | SaaS2 | IF-S2 |
| User1 | SaaS3 | IF-S3 |
| User2 | SaaS4 | IF-S4 |

FIG. 7

CONTROL INFORMATION STORAGE UNIT 110

FILTER TEMPLATE TABLE 112

| FROM PORT | TO PORT | Protocol | From-IF | To-IF | SaaS1 PERMIT/DENY |
|---|---|---|---|---|---|
| 80 | * | TCP | <Local> | <User> | Permit |
| * | 80 | TCP | <User> | <Local> | Permit |
| * | * | * | <Local> | <User> | Deny |
| * | * | * | <User> | <Local> | Deny |

FILTER TEMPLATE TABLE 112a

| FROM PORT | TO PORT | Protocol | From-IF | To-IF | SaaS2 PERMIT/DENY |
|---|---|---|---|---|---|
| 80 | * | TCP | <Local> | <User> | Permit |
| * | 80 | TCP | <User> | <Local> | Permit |
| 631 | * | TCP | <User> | <Local> | Permit |
| * | * | * | <Local> | <User> | Deny |
| * | * | * | <User> | <Local> | Deny |

FILTER TABLE 311a

| FROM PORT | TO PORT | Protocol | From-IF | To-IF | PERMIT/DENY |
|---|---|---|---|---|---|
| 80 | * | TCP | IF-S1 | IF-U1 | Permit |
| * | 80 | TCP | IF-U1 | IF-S1 | Permit |
| * | * | * | IF-S1 | IF-U1 | Deny |
| * | * | * | IF-U1 | IF-S1 | Deny |
| 80 | * | TCP | IF-S2 | IF-U1 | Permit |
| * | 80 | TCP | IF-U1 | IF-S2 | Permit |
| 631 | * | * | IF-S2 | IF-U1 | Permit |
| * | * | * | IF-U1 | IF-S2 | Deny |
| * | * | * | IF-S1 | IF-S2 | Deny |
| ... | ... | ... | ... | ... | ... |

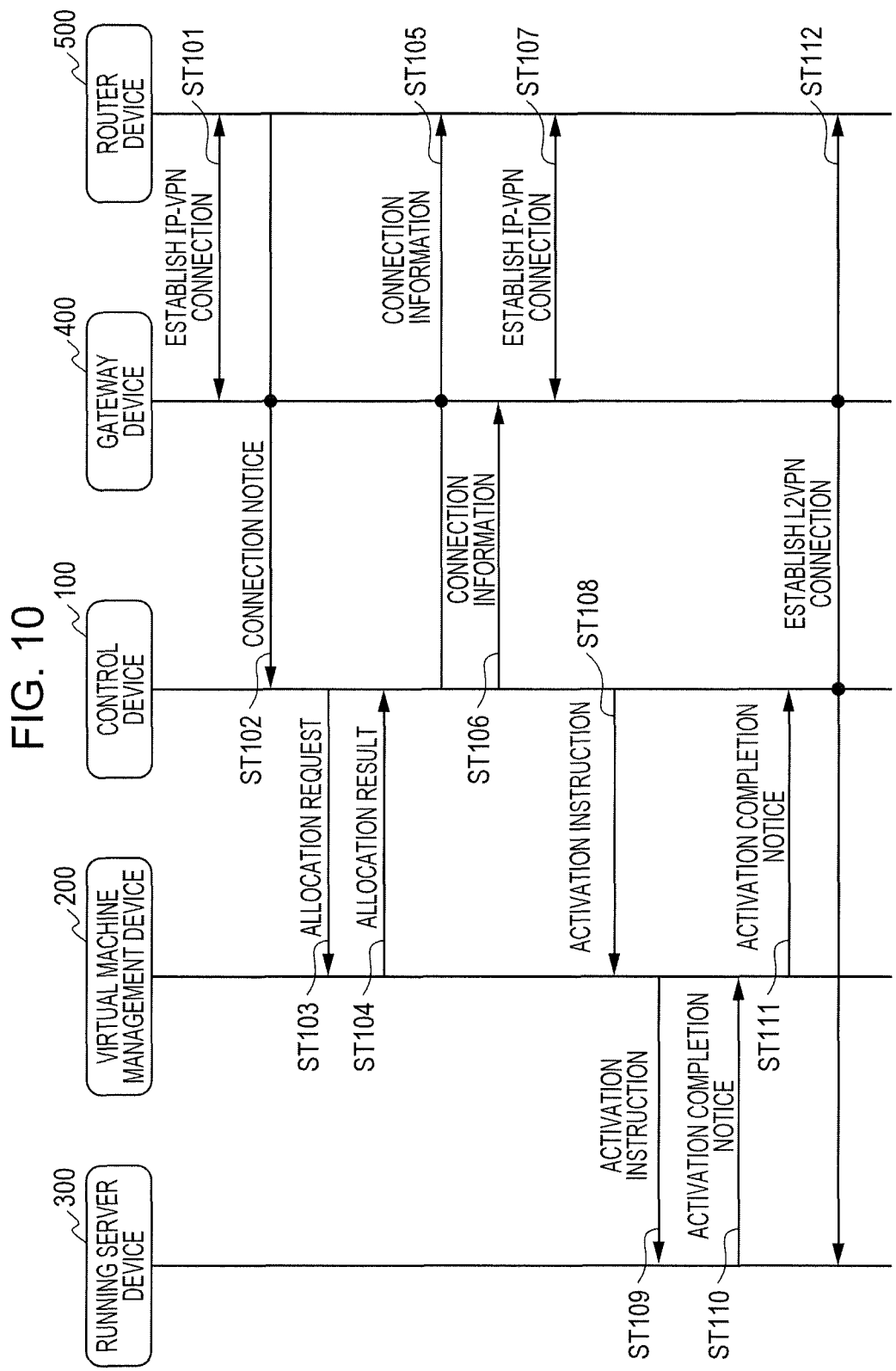

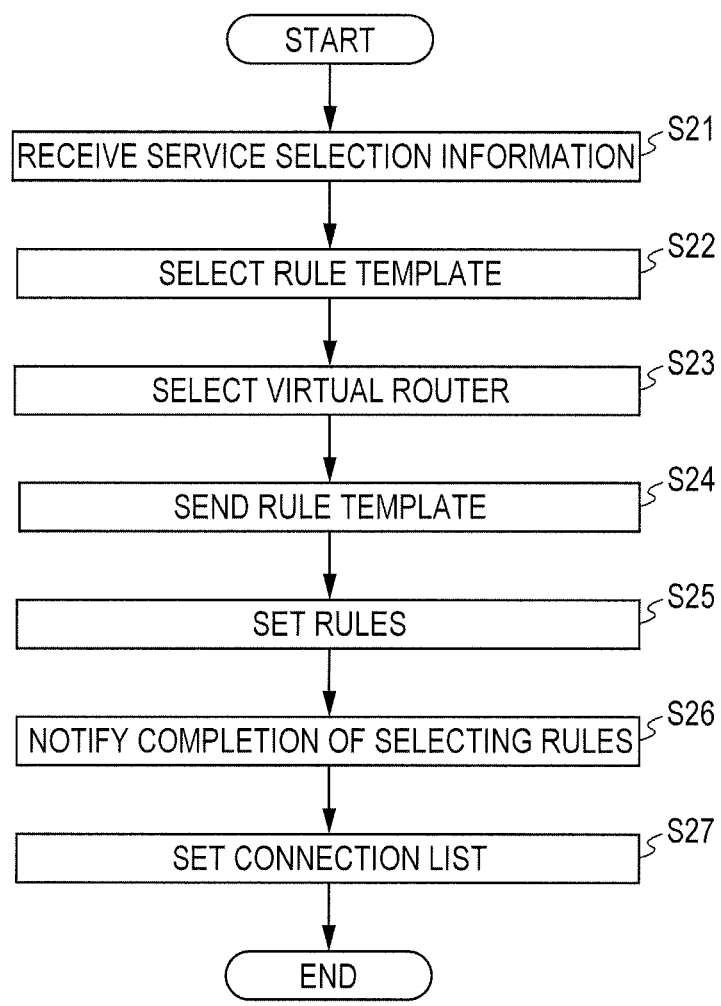

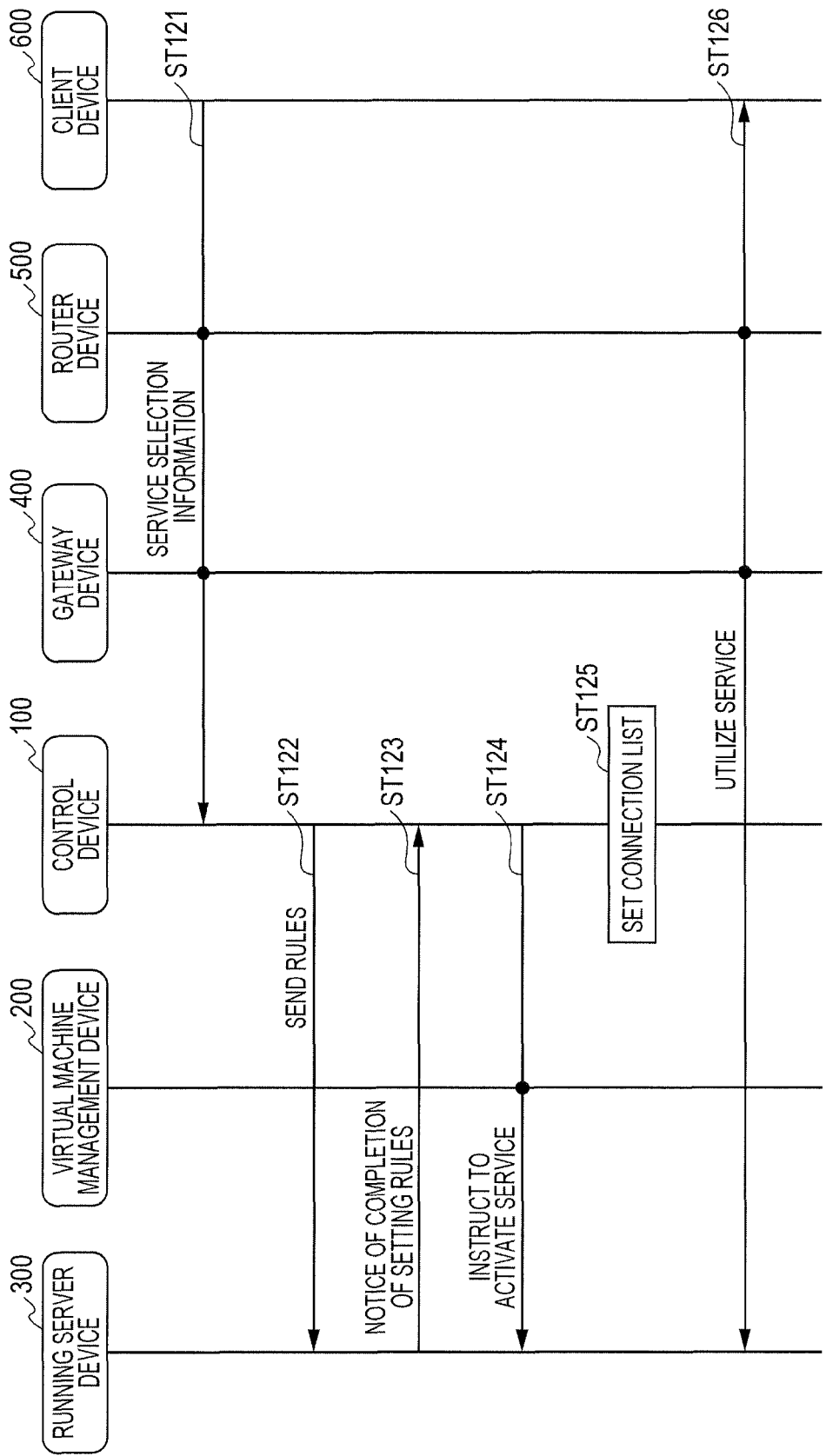

FIG. 13

CONTROL INFORMATION STORAGE UNIT (110)

FILTER TEMPLATE TABLE (113)

| FROM PORT | TO PORT | Protocol | From-IF | To-IF | FOR CONNECTION BETWEEN SaaS1-ANOTHER SaaS | |
|---|---|---|---|---|---|---|
| | | | | | Flag | PERMIT/DENY |
| * | * | TCP | <Local> | <SaaS> | NEW,Established | Permit |
| * | * | TCP | <SaaS> | <Local> | Established | Permit |
| * | * | * | <Local> | <SaaS> | — | Deny |
| * | * | * | <SaaS> | <Local> | — | Deny |

FILTER TEMPLATE TABLE (113a)

| FROM PORT | TO PORT | Protocol | From-IF | To-IF | FOR CONNECTION BETWEEN SaaS1-ANOTHER SaaS | |
|---|---|---|---|---|---|---|
| | | | | | Flag | PERMIT/DENY |
| 80 | * | TCP | <Local> | <SaaS> | — | Permit |
| * | 80 | TCP | <SaaS> | <Local> | — | Permit |
| * | * | TCP | <Local> | <SaaS> | NEW,Established | Permit |
| * | * | * | <SaaS> | <Local> | Established | Permit |
| * | * | * | <Local> | <SaaS> | — | Deny |
| * | * | * | <SaaS> | <Local> | — | Deny |

FILTER TABLE 311b

| FROM PORT | TO PORT | Protocol | From-IF | To-IF | Flag | PERMIT/DENY |
|---|---|---|---|---|---|---|
| ... | ... | ... | ... | ... | ... | ... |
| * | * | TCP | IF-S1 | IF-S2 | NEW,Established | Permit |
| * | * | TCP | IF-S2 | IF-S1 | Established | Permit |
| * | * | * | IF-S1 | IF-S2 | – | Deny |
| * | * | * | IF-S2 | IF-S1 | – | Deny |
| ... | ... | ... | ... | ... | ... | ... |
| 80 | * | TCP | IF-S2 | IF-S1 | – | Permit |
| * | 80 | TCP | IF-S1 | IF-S2 | – | Permit |
| * | * | TCP | IF-S2 | IF-S1 | NEW,Established | Permit |
| * | * | TCP | IF-S1 | IF-S2 | Established | Permit |
| * | * | * | IF-S2 | IF-S1 | – | Deny |
| * | * | * | IF-S1 | IF-S2 | – | Deny |
| ... | ... | ... | ... | ... | ... | ... |

A: rows 1–4; B: rows 5–10

APPARATUS AND METHOD FOR MONITORING COMMUNICATION PERFORMED BY A VIRTUAL MACHINE

CROSS-REFERENCE TO RELATED APPLICATION

This application is based upon and claims the benefit of priority of the prior Japanese Patent Application No. 2011-143675, filed on Jun. 29, 2011, the entire contents of which are incorporated herein by reference.

FIELD

The embodiments discussed herein are related to an apparatus and method for monitoring communication performed by a virtual machine.

BACKGROUND

In these days, virtualization technologies in which a plurality of virtual computers (sometimes called virtual machines or logical hosts) works on a physical computer (sometimes called a physical machine or a physical host) are used in fields of data processing. Software programs including an OS (Operating System) are allowed to be run on the respective virtual machines. The physical machine using the virtualization technology runs a software program for managing the plural virtual machines.

A software program called a hypervisor, for example, allocates data processing capabilities of a CPU (Central Processing Unit) and storage areas in a RAM (Random Access Memory) to each of plural virtual machines as a resource for arithmetic operations. Further, the hypervisor sometimes implements a network routing function on the physical machine using resources for arithmetic operations. The routing function implemented on the physical machine is sometimes called a virtual router. Making virtual routers relay communication among the virtual machines allows a network of the virtual machines to be built on the physical machine. In this way, a data processing system may be configured to work a virtual machine on a physical machine and to make a service implemented on the virtual machine accessible from a client device.

A firewall is sometimes provided on a communication route in a network in order to maintain security for communication via the network. The firewall filters traffic on the network according to a predetermined rule, and cuts off communication that is performed using communication paths or protocols except for allowable ones.

For example, a method is proposed in which, when a user terminal device is connected to a certain network via a gateway device, the gateway device is provided with a filtering table that is beforehand set for a network to be connected with and the gateway device filters traffic based on the filtering table.

Further, a method is proposed in which, when a user terminal device starts to be connected to an external network via a firewall device, the firewall device obtains a filter rule corresponding to a user from a policy server device.

Japanese Laid-open Patent Publication No. 2003-244245 (paragraphs 0038-0042) and International Publication Pamphlet No. WO 04071038 (from 3th line on page 32 to 6th line on page 33) discuss related arts.

SUMMARY

According to an aspect of the invention, an apparatus stores, in association with each of one or more services, a communication monitoring rule under which communication performed for providing the each of the one or more services is to be monitored. The apparatus communicates with another apparatus that is operable to run a virtual machine and run a virtual router relaying communication performed by the virtual machine. When a service to be provided by the virtual machine is selected from among the one or more services, the apparatus controls the virtual router to monitor communication performed by the virtual machine according to the communication monitoring rule associated with the selected service, by sending the communication monitoring rule to the virtual router.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6 is a diagram illustrating an example of a connection list table, according to a second embodiment;

FIG. 7 is a diagram illustrating an example of a filter template table, according to a second embodiment;

FIG. 8 is a diagram illustrating an example of a filter table, according to a second embodiment;

FIG. 10 is a diagram illustrating an example of an operational sequence for activating a virtual machine, according to a second embodiment;

FIG. 11 is a diagram illustrating an example of an operational flowchart for setting a filter, according to a second embodiment;

FIG. 12 is a diagram illustrating an example of an operational sequence for setting a filter, according to a second embodiment;

FIG. 13 is a diagram illustrating an example of a filter template table, according to a third embodiment;

FIG. 14 is a diagram illustrating an example of a filter table, according to a third embodiment.

DESCRIPTION OF EMBODIMENTS

In a data processing system that allows a service provided by a virtual machine to be accessible from a client device, the content of communication between the virtual machine and the client machine sometimes differs from the content of communication between the virtual machine and another virtual machine, depending upon the service to be provided. For example, a service for enabling Web access sometimes and a service for enabling file transfer sometimes use different port numbers for communication. Thus, it is preferable to take a communication security measure that meets a service to be provided by each of the virtual machines. In this case, how to easily set a rule for monitoring communication to each of the virtual machines becomes problematic.

For example, when a user does not select a service to be provided by the virtual machine until beginning of use of the service, it is difficult to set a rule corresponding to the service in advance. Further, when a plurality of virtual machines works on a plurality of physical machines and a system administrator attempts to set a rule associated with a service available on each of the virtual machines to each of the virtual or physical machines, the system administrator may suffer from workloads needed for setting the rules.

Hereinafter, embodiments will be explained with reference to drawings.

(First Embodiment)

Figure 1:
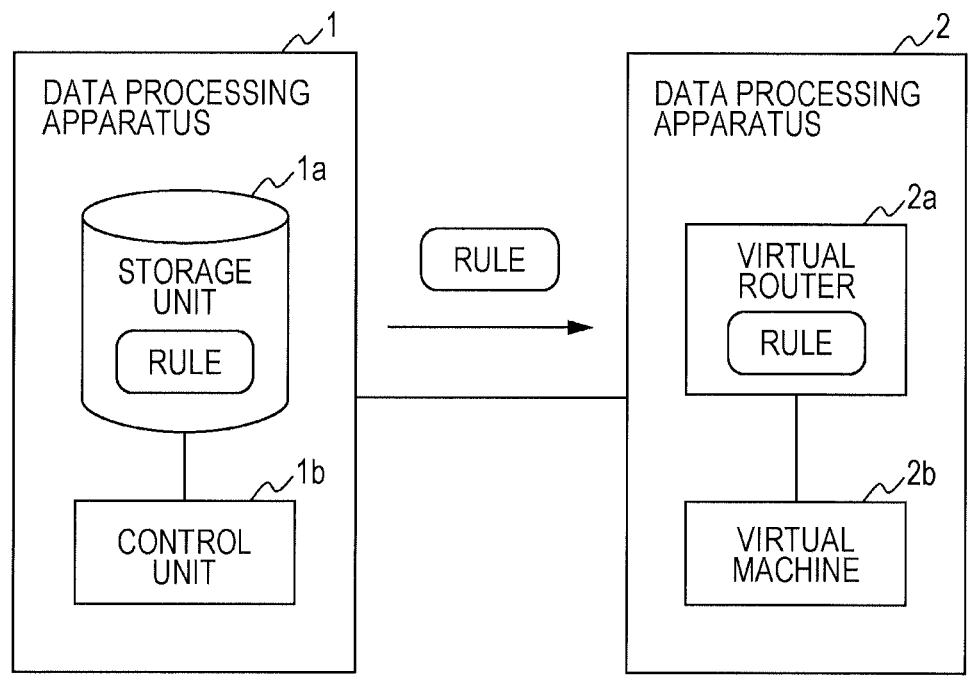
FIG. 1 is a diagram illustrating an example of a data processing system, according to a first embodiment.

FIG. 1 is a diagram illustrating an example of a data processing system, according to a first embodiment. The data processing system, for example, includes data processing apparatuses 1 and 2. The data processing apparatus 1 communicates with the data processing apparatus 2. A virtual router 2a and a virtual machine 2b are operable on the data processing apparatus 2. The virtual router 2a relays communication for the virtual machine 2b.

The data processing apparatus 1, for example, includes a storage unit 1a and a control unit 1b. The storage unit is stores a rule that is used for a virtual router to monitor communication and defined for each of services. Hereinafter, the rule will be also expressed as "a communication monitoring rule". The storage unit 1a may be implemented by a RAM or an HDD (Hard Disk Drive). A communication monitoring rule may be defined, for example, as a rule for filtering communication. The communication monitoring rule may define what is to be filtered according to a service available on a virtual machine. For example, it is conceivable that limitation is set on communication performed via communication ports other than the communication port used by the service. Further, it is also conceivable that limitation is set on communication according to transmission protocols other than transmission control protocols used in the service, such as TCP (Transmission Control Protocol) or UDP (User Datagram Protocol).

When a service to be provided by the virtual machine 2b is selected, the control unit 1b refers to the storage unit 1a and sends a communication monitoring rule meeting the selected service to the virtual router 2a so that the virtual router 2a monitors, based on the communication monitoring rule, communication performed by the virtual machine 2b. A service to be provided by the virtual machine 2b is selected, for example, by a user who uses the virtual machine 2b. For example, the user may input the result of selecting a service to the data processing apparatus 1 by manipulating a terminal device that is communicably coupled to the data processing apparatus 1 via a network.

By means of the data processing apparatus 1, when a service to be provided by the virtual machine 2b is selected, the control unit 1b refers to the storage unit 1a and sends a communication monitoring rule meeting the selected service to the virtual router 2a. Upon receiving the communication monitoring rule, the virtual router 2a monitors communication performed by the virtual machine 2b based on the received communication monitoring rule.

This allows the communication monitoring rule to be set easily. For example, when a service of the virtual machine 2b is selected, a communication monitoring rule may be easily set to the virtual router 2a that relays communication performed by the virtual machine 2b, by sending the communication monitoring rule defined for each of services to the virtual router 2a. Further, even when a plurality of virtual machines works on a plurality of data processing apparatuses, a communication monitoring rule for a service selected for each of the virtual machines is automatically obtained and sent to a virtual router corresponding to the each virtual machine. This allows the system administrator to reduce a workload needed for setting the communication monitoring rules.

Various sorts of content may be defined as a communication monitoring rule. For example, a communication monitoring rule may be defined as a filter between the virtual machine 2b and a terminal device that is used by a user to access the virtual machine 2b via the virtual router 2a (or a network that the terminal device belongs to). This allows communication security to be enhanced when a selected service is provided by performing communication between the terminal device (or network that the terminal device belongs to) and the virtual machine 2b.

Further, for example, the communication monitoring rule may be defined as a filter that limits communication performed via a communication path between the virtual machine 2b providing a first service and another virtual machine providing a second service. In this case, when the first service is selected for the virtual machine 2b, the control unit 1b may obtain, from the storage unit 1a, a communication monitoring rule meeting a combination of the first and second services, and sends the obtained communication monitoring rule to the virtual router 2a in addition to a communication monitoring rule meeting the first service. This allows communication security to be enhanced between virtual machines that are connected to each other.

(Second Embodiment)

Figure 2:
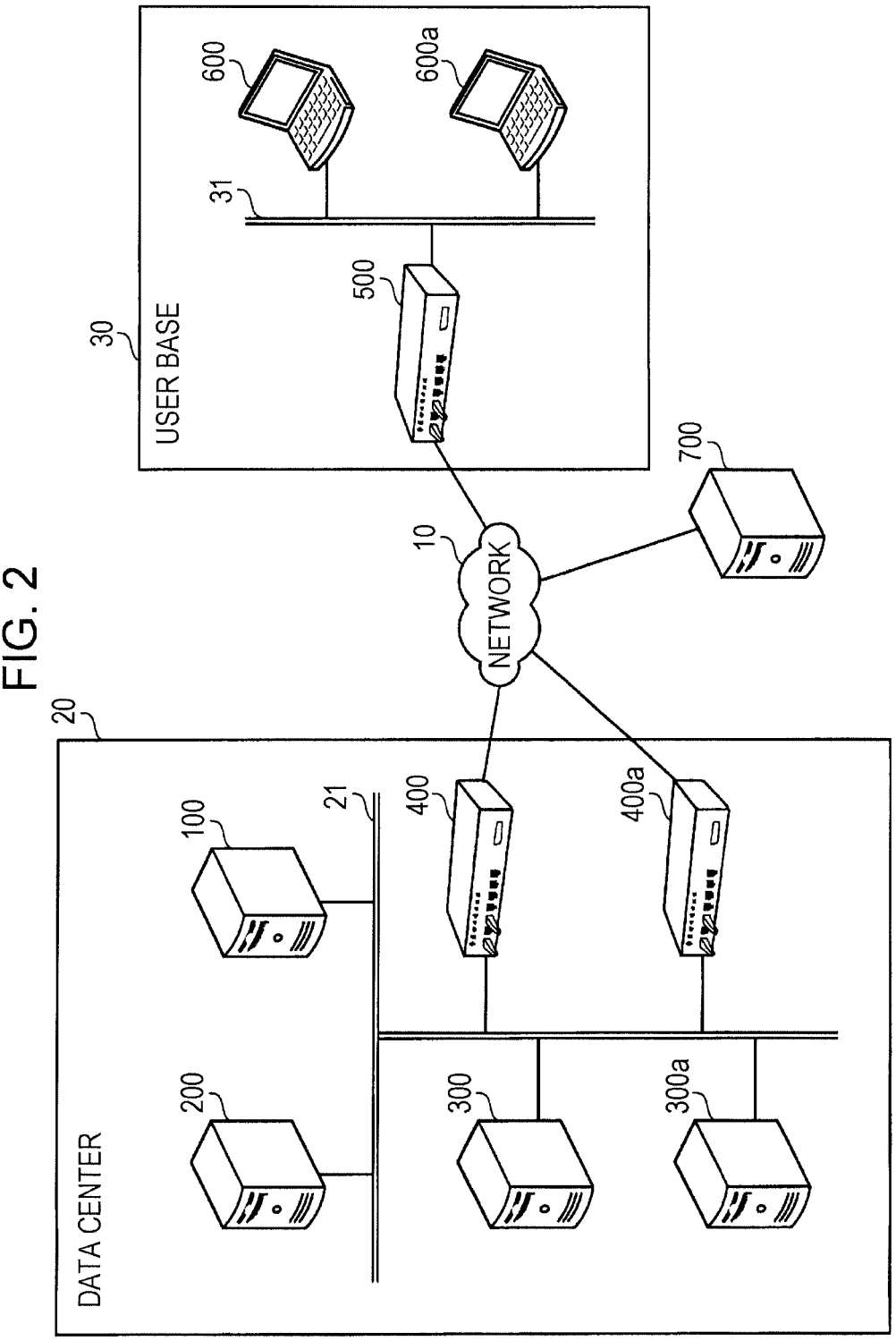
FIG. 2 is a diagram illustrating an example of a data processing system, according to a second embodiment.

FIG. 2 is a diagram illustrating an example of a data processing system, according to a second embodiment. FIG. 2 illustrates a data center 20 and a user site 30 that are facilities operated by a service provider and a user, respectively. The service provider operates a plurality of virtual machines on a server device in the data center 20 so as to make the plurality of virtual machines accessible from the user site 30. For example, the user may use a service implemented by a software program, by requesting, from a client device installed in the user site 30, the software program on the virtual machine to perform a predetermined processing. Such a utilization form of software is sometimes called SaaS (Software as a Service).

The data processing system may be configured to include a control device 100, a virtual machine management device 200, running server devices 300 and 300a, gateway devices 400 and 400a, a router device 500, client devices 600 and 600a, and a communication service provider server device 700.

The control device 100, the virtual machine management device 200, the running server devices 300 and 300a, and the gateway devices 400 and 400a are installed in the data center 20, and are individually connected to a network 21 in the data center 20. The router device 500 and the client devices 600 and 600a are installed in the user site 30, and are individually connected to a network 31 in the user site 30. The communication service provider server device 700 is installed in a facility of a communication service provider (not depicted in FIG. 2), and is connected to a network 10. The network 10 may be an IP (Internet Protocol) network managed by the communication service provider. The network 10 is, for example, a PPPoE (Point to Point Protocol over Ethernet)-based network.

The control device 100 is a data processing apparatus that supports a tunnel connection to be established on an L2VPN (Layer2 Virtual Private Network) basis between virtual routers on the running server devices 300 and 300a and the router device 500. The control device 100 allows a VPN connection to be established via the IP network from the client device 600 or 600a to a virtual machine that communicates with the virtual router.

The virtual machine management device 200 is a data processing apparatus that controls the activation of virtual machines and routers running on the running server devices 300 and 300a. The virtual machine management device 200 manages operating states indicating which running server device operates which virtual machine or virtual router. The virtual machine management device 200 further manages information on a virtual network IF (InterFace) provided for a virtual router.

The running server devices 300 and 300a are each a data processing apparatus that activates a virtual machine and a virtual router according to an activation instruction issued by the virtual machine management device 200. For example, the running server devices 300 and 300a each executes a hypervisor. Upon being instructed to activate a virtual machine or a virtual router by the virtual machine management device 200, the hypervisor activates the virtual machine or virtual router by using resources on the running server device 300 or 300a.

The gateway devices 400 and 400a are each a communication device for relaying communication between the networks 10 and 21.

The router device 500 is a communication device that relays communication between the networks 10 and 31. The router device 500 has a function to accept a selection of a service to be used by a user who wants to use the service on a virtual machine allocated by the service provider. The router device 500 sends information on the result of selecting a service to the control device 100 so as to request the control device 100 to make the selected service available on the virtual machine allocated to the user.

The client devices 600 and 600a are each a data processing apparatus used by a user. The user may request a virtual machine on the running server device 300 or 300a to run a process by manipulating the client device 600 or 600a. The user may use a virtual machine on the running server device 300 or 300a from the client device 600 or 600a, for example, using a Web browser, RDP (Remote Desktop Protocol), VNC (Virtual Network Computing), SSH (Secure SHell), and FTP (File Transfer Protocol).

The communication service provider server device 700 provides information needed for connecting the gateway devices 400, 400a and the router device 500 to the network 10, in response to an request from the control device 100. For example, the communication service provider server device 700 informs the gateway devices 400, 400a and the router device 500 of a user ID (IDentifier) and a password of the PPPoE. The gateway devices 400, 400a and the router device 500 are each certified on a PPPoE-basis by a predetermined certifying server in the network 10 on the basis of the provided information so as to be connected to the network 10. Further, for example, the communication service provider server device 700 provides information needed for connecting the gateway devices 400, 400a and the router device 500 with each other on an IP-VPN basis. The gateway devices 400, 400a and the router device 500 establish an IP-VPN connection on the basis of the provided information.

Figure 3:
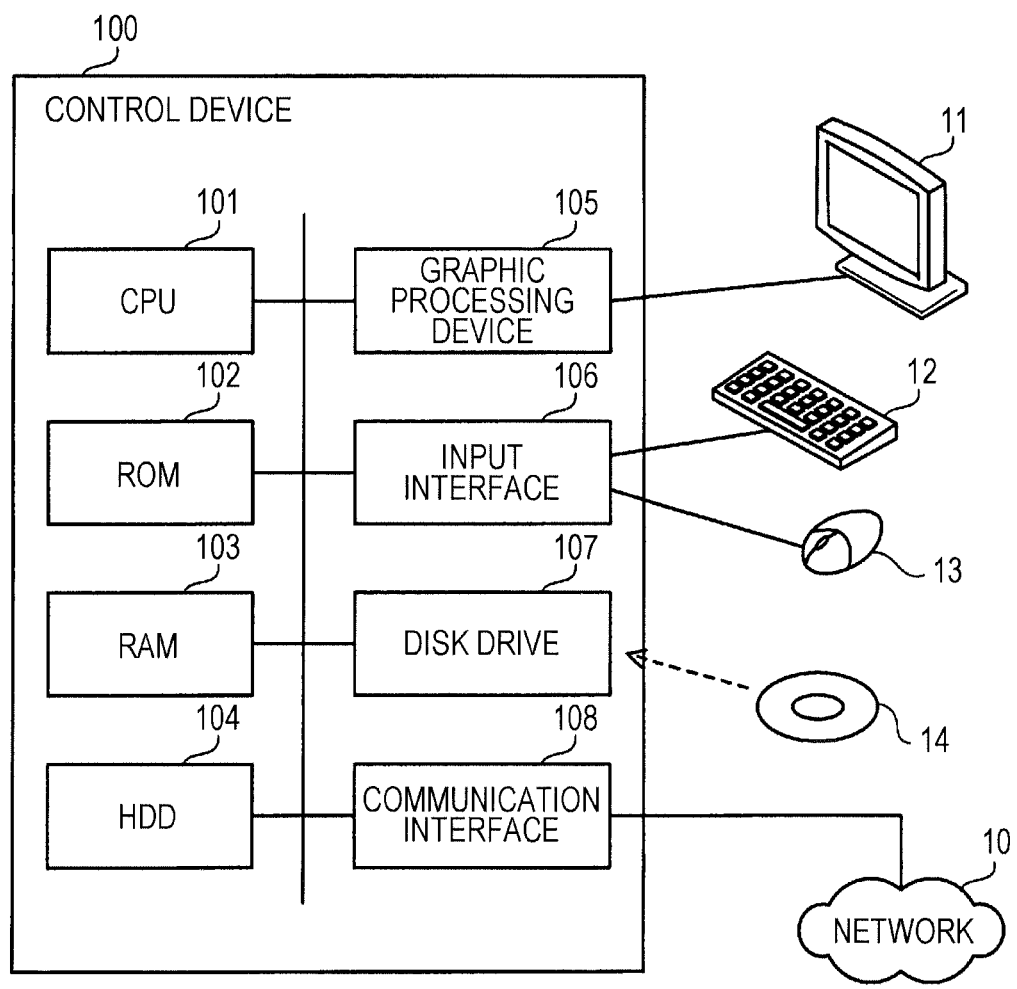
FIG. 3 is a diagram illustrating a hardware configuration of a control device, according to a second embodiment.

FIG. 3 is a diagram illustrating a hardware configuration of a control device, according to a second embodiment. For example, the control device 100 may be configured to include a CPU 101, a ROM (Read Only Memory) 102, a RAM 103, an HDD 104, a graphic processing device 105, an input interface 106, a disk drive 107, and a communication interface 108.

The CPU 101 runs programs of an OS and applications, and controls the entirety of the control device 100.

The ROM 102 stores therein predetermined programs such as a BIOS (Basic Input/Output System) program to be run when the control device is activated. The ROM 102 may be a rewritable non-volatile memory.

The RAM 103 temporarily stores therein at least part of the OS and application programs to be run by the CPU 101. Further, the RAM 103 temporarily stores therein at least part of data to be used for the processing of the CPU 101.

The HDD 104 stores therein the OS and application programs. Further, the HDD 104 stores therein data to be used for the processing of the CPU 101. Further, another kind of non-volatile memory devices such as an SSD (Solid State Drive) may be used instead of (or in addition to) the HDD 104.

The graphic processing device 105 is connected to a monitor 11. The graphic processing device 105 displays an image on the monitor 11 according to an instruction issued by the CPU 101.

The input interface 106 is connected to input devices such as a keyboard 12 and a mouse 13. The input interface 106 outputs signals sent from the input devices to the CPU 101.

The disk drive 107 is a reading device that reads data recorded on a recording medium 14. For example, a program to be run by the control device 100 may be recorded on the recording medium 14. The control device 100 may implement a function described later, for example, by executing the program recorded on the recording medium 14. That is, the program may be distributed using the computer-readable recording medium 14 on which the program is recorded.

As the recording medium 14, for example, a magnetic recording device, an optical disk, a magneto-optical recording medium, or a semiconductor memory may be used. The magnetic recording device may be, for example, an HDD, a flexible disk (FD), or a magnetic tape. The optical disk may be, for example, a CD (Compact Disc), a CD-R (Recordable)/RW (ReWritable), a DVD (Digital Versatile Disc), or a DVD-R/RW/RAM. The magneto-optical recording medium may be, for example, an MO (Magneto-Optical disk). The semiconductor memory may be a flash memory such as a USB (Universal Serial Bus) memory.

The communication interface 108 is connected to the network 10. The communication interface 108 may perform data communication, via the network 21, with the virtual machine management device 200, the running server devices 300, 300a, and the gateway devices 400, 400a. Further, the communication interface 108 may perform data communication with the router device 500 and the communication service provider server device 700 via the gateway devices 400, 400a, and the network 10.

The virtual machine management device 200, the running server devices 300, 300a, the client devices 600, 600a, and the communication service provider server device 700 may be each implemented by a hardware configuration similar to that of the control device 100.

Hereinafter, out of the gateway devices 400 and 400a, description will be given primarily of the gateway device 400, and the description of the gateway device 400a will be omitted here since the gateway device 400a is configured in a manner similar to the gate way device 400.

Figure 4:
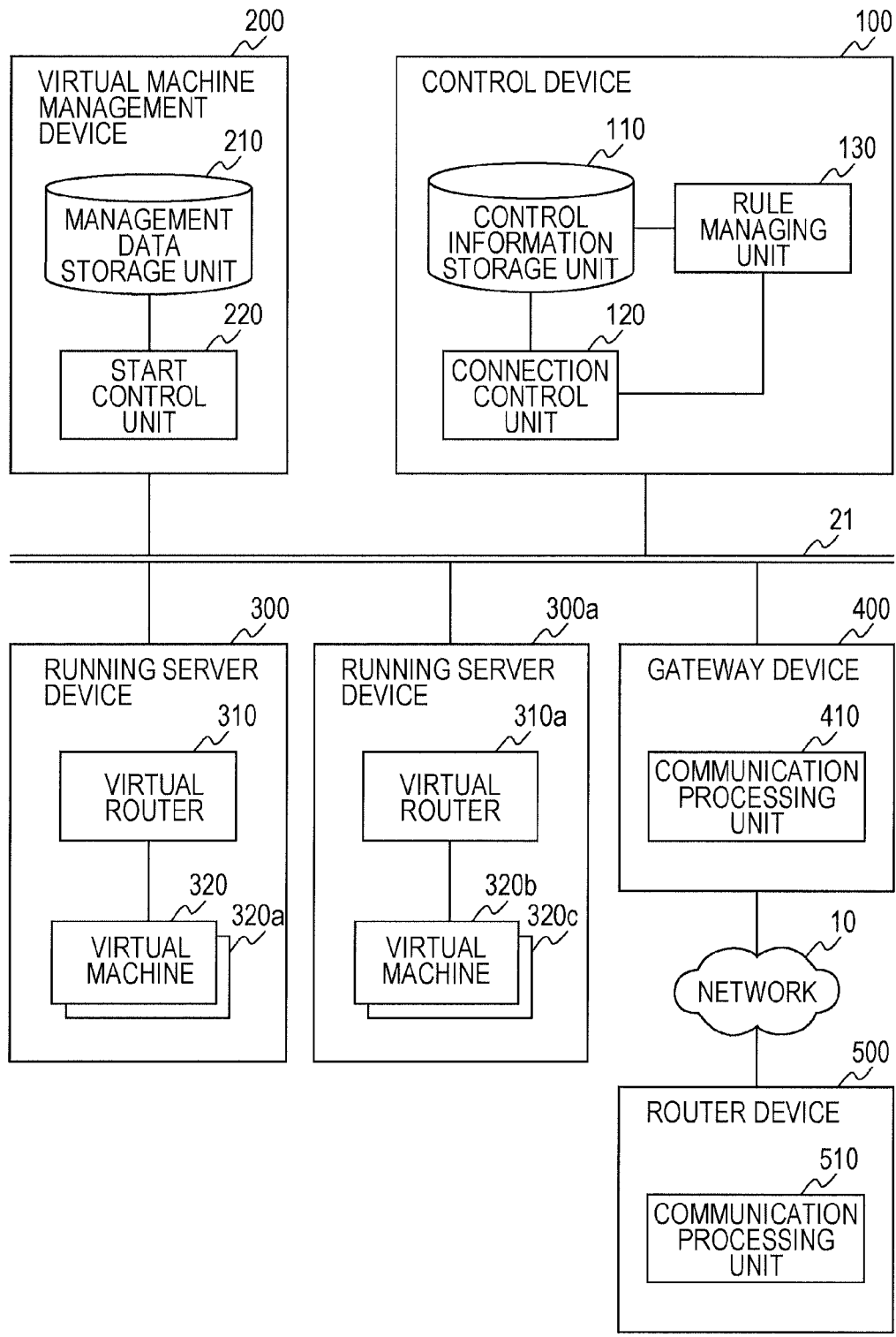
FIG. 4 is a diagram illustrating an example of device configurations, according to a second embodiment.

FIG. 4 is a diagram illustrating an example of a functional configuration, according to a second embodiment. The control device 100 may be configured to include a control information storage unit 110, a connection control unit 120, and a rule managing unit 130. Functions of components (units) in the control device 100 may be implemented, for example, by causing the CPU 101 to execute predetermined programs. All or part of the functions of the components of the control device 100 may be implemented using dedicated hardware components.

The control information storage unit 110 stores therein control information. The control information includes a connection list table and a filter template table. The connection list table stores user identification information identifying each of users, in association with service identification information identifying a service being used by the each user identified by the user identification information. The filter template table stores a default filter rule in association with each of services.

The connection control unit 120 controls connections between the router device 500 and virtual routers on the running server devices 300 and 300a. For example, the connection control unit 120 instructs the virtual machine management device 200 to allocate the gateway devices 400, 400a to the router device 500 in response to a request from the router device 500. Further, the connection control unit 120 instructs the virtual machine management device 200 to activate the virtual machines and virtual routers on the running server devices 300, 300a in response to a request from the router device 500. Then, the connection control unit 120 establishes an L2VPN connection between the virtual routers on the running server devices 300, 300a and the router device 500.

In this case, the connection control unit 120 establishes a PPPoE connection between the gateway device 400 and the network 10, in cooperation with the communication service provider server device 700. Further, the connection control unit 120 establishes a PPPoE connection between the router device 500 and the network 10 in cooperation with the communication service provider server device 700. The connection control unit 120 connects the gateway device 400 with the router device 500 via an IP-VPN.

Further, the connection control unit 120 establishes a tunnel connection of an EtherIP (Ethernet over IP) between the virtual router and the router device 500. The virtual router and the router device 500 exchange an Ethernet frame between the client device 600 or 600a and the virtual machine on the running server device 300 or 300a by encapsulating the Ethernet frame according to the EtherIP. The L2VPN connections allow client devices 600, 600a and the virtual machine to be connected with each other on a VPN basis via the network 10 that is an IP network of the communication service provider.

Further, the connection control unit 120 receives, from the router device 500, service selection information identifying a service selected by the user. The connection control unit 120 sends the service selection information to the rule managing unit 130 and the start control unit 220. The service selection information includes information indicating which service is selected in association with which virtual machine allocated to the user.

The rule managing unit 130 sends a communication monitoring rule to the virtual router on the running server device 300 or 300a. For example, upon receiving service selection information identifying a service selected by the user from the connection control unit 120, the rule managing unit 130 obtains a communication monitoring rule corresponding to the selected service from the control information storage unit 110, and sends the obtained communication monitoring rule to the virtual router corresponding to the virtual machine allocated to the user.

The virtual machine management device 200 may be configured to include a management data storage unit 210 and the start control unit 220. Functions of the components (units) of the virtual machine management device 200 may be implemented, for example, by causing a CPU provided for the virtual machine management device 200 to execute predetermined programs. All or part of the functions of the components of the virtual machine management device 200 may be implemented using dedicated hardware components.

The management data storage unit 210 stores therein management data. The management data includes information on the running server devices 300, 300a and the gateway devices 400, 400a. For example, the management data includes information on resources being available on the running servers 300, 300a, information on an allocation state indicating which one of virtual machines is allocated to which one of users, information on correspondences between virtual machines and virtual routers, and information on a virtual network IF of each of the virtual routers. Further, the management data includes information on resources being available on the gateway devices 400, 400a and information on an allocation state indicating which one of gateway devices 400, 400a is allocated to which one of the users.

The start control unit 220 receives instructions to allocate the gateway device 400 or 400a to the user from the connection control unit 120. Then, the start control unit 220 refers to the management data storage unit 210 and allocates the gateway device 400 or 400a to the user. The start control unit 220 stores, in the management data storage unit 210, information on the correspondence between the user and the allocated gateway device.

Upon receiving an instruction to activate the virtual machine allocated to the user from the connection control unit 120, the start control unit 220 selects a running server device that activates the virtual machine and virtual router by referring to the management data storage unit 210. The start control unit 220 causes the selected running server device to activate the virtual machine and virtual router. The start control unit 220 stores, in the management data storage unit 210, information on correspondences among the user, the allocated running server device, and the allocated virtual machine and virtual router. The start control unit 220 responds to inquiries received from the connection control unit 120 by referring to the management data storage unit 210. For example, the start control unit 220 may respond to inquiries regarding correspondences between the running server device and the virtual machine and virtual router, correspondences between the virtual router and a virtual network IF on the virtual router, and correspondences between the virtual machine and the network IF.

Further, upon receiving information on a service selected by the user from the connection control unit 120, the start control unit 220 causes the virtual machine allocated to the user to execute a program for providing the selected service.

The running server device 300 may be configured to, for example, include a virtual router 310 and virtual machines 320, 320a. Functions of the components of the running server device 300 may be implemented, for example, by causing a CPU provided for the running server device 300 to run predetermined programs. All or part of the functions of the components of the running server device 300 may be implemented using dedicated hardware components.

The virtual router 310 relays communication between the network 21 and the virtual machines 320, 320a. The virtual router 310 monitors communication data that is relayed. For example, the virtual router 310 filters communication on the basis of a filtering rule obtained from the rule managing unit 130.

The virtual machines 320, 320a are virtual machines that are implemented on the running server device 300. The virtual machines 320, 320a each execute an OS independently. The OS executed by the virtual machine 320 may be identical to or different from an OS executed by the virtual machine 320a. The virtual machines 320, 320a each execute a software program for providing a predetermined service. As described above, which service is to be provided by the virtual machines 320, 320a is determined by the selection of service that is made by a user.

The running server device 300a may be configured, for example, to include a virtual router 310a and virtual machines 320b, 320c. The virtual router 310a relays communication between the network 21 and the virtual machine 320b. Further, the virtual router 310a monitors communication data that is relayed. The virtual machines 320b, 320c are virtual machines that are implemented on the running server device 300a and each execute a software program for providing a predetermined service.

The gateway device 400 may be configured, for example, to include a communication processing unit 410 that establishes a PPPoE connection with the network 10, based on the data obtained from the connection control unit 120. Further, the communication processing unit 410 establishes an IP-VPN connection with the router device 500.

The router device 500 includes a communication processing unit 510 that establishes L2VPN connections with the network 10, the gateway device 400, and the virtual routers 310, 310a, based on the data obtained from the connection control unit 120. Further, the communication processing unit 510 provides the client devices 600, 600a with an interface used for selecting a service. The user selects a service that the user wants to use, by means of the provided interface. The communication processing unit 510 sends information on the selection of service to the control device 100.

Figure 5:
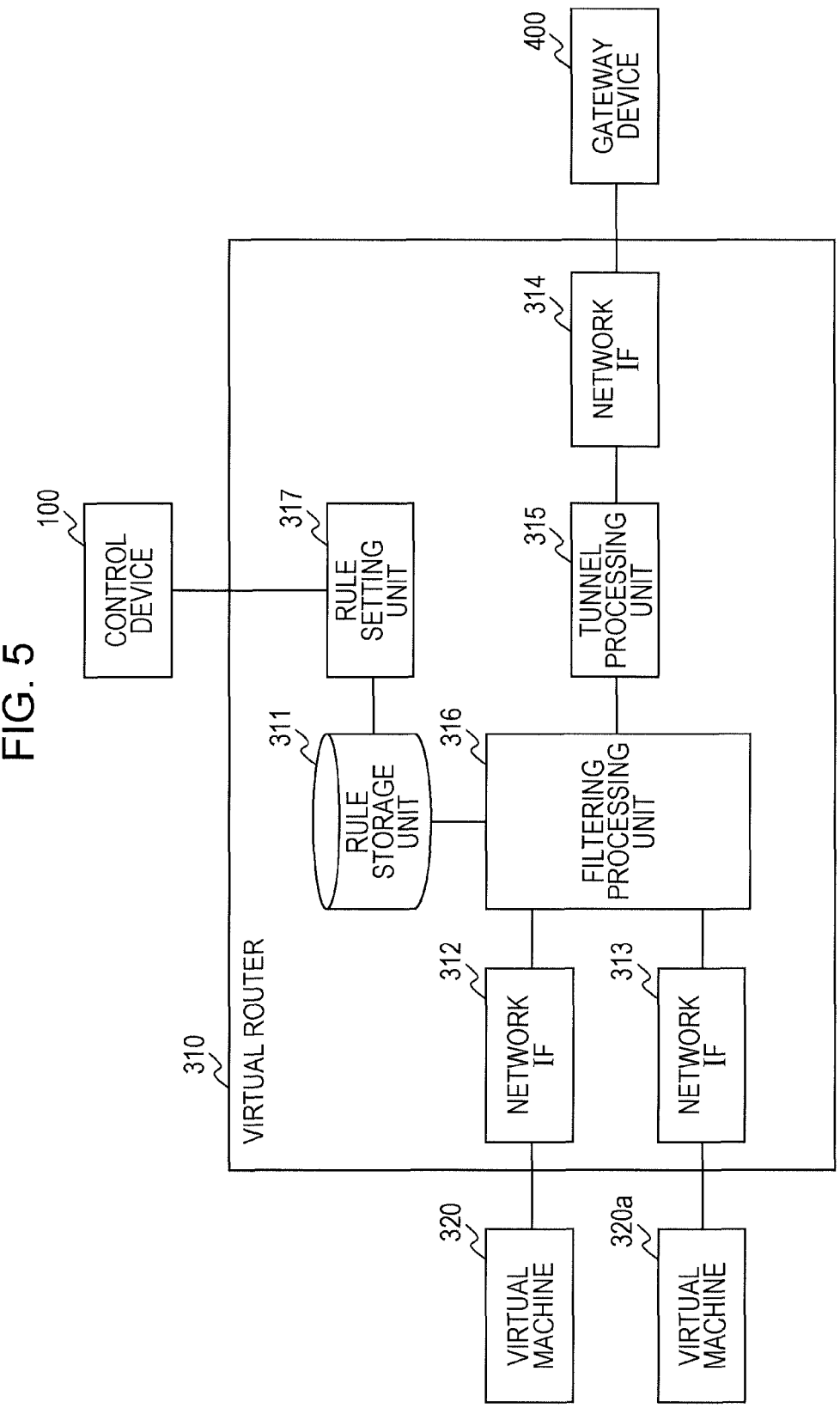
FIG. 5 is a diagram illustrating a configuration example of a virtual router, according to a second embodiment.

FIG. 5 is a diagram illustrating a configuration example of a virtual router, according to a second embodiment. The virtual router 310 may be configured, for example, to include a rule storage unit 311, network IFs 312, 313, 314, a tunnel processing unit 315, a filter processing unit 316, and a rule setting unit 317.

The rule storage unit 311 stores therein a communication monitoring rule that is received from the control device 100 and used for monitoring communication.

The network IFs 312, 313, 314 are each a virtual network IF implemented on the virtual router 310. The network IF 312 communicates with the virtual machine 320. The network IF 313 communicates with the virtual machine 320a.

Hereinafter, a network that connects the network IFs 312, 313 to the virtual machines 320, 320a will be also expressed as "a network on the virtual machine side". The network IF 314 communicates with the gateway device 400 via the network 21. Further, a network that connects the network IF 314, the gateway device 400, and the user site 30 will be also expressed as "a network on the user side".

The tunnel processing unit 315 terminates an EtherIP-based tunnel connection. For example, upon receiving communication data encapsulated according to an EtherIP from the network IF 314, the tunnel processing unit 315 extracts an Ethernet frame from the received communication data and outputs the extracted Ethernet frame to the filter processing unit 316. Further, the tunnel processing unit 315 encapsulates an Ethernet frame received from the filter processing unit 316 according to an EtherIP and outputs the encapsulated Ethernet frame to the network IF 314.

The filter processing unit 316 monitors an Ethernet frame and imposes limitations on communication between the network on the user side and the network on the virtual machine side. For example, the filter processing unit 316 performs a filtering operation using information on destination or source of the Ethernet frame and a port number, according to a filter rule stored in the rule storage unit 311.

The rule setting unit 317 receives a communication monitoring rule from the control device 100 and stores the received rule in the rule storage unit 311. When the existing rules are already stored in the rule storage unit 311, the rule setting unit 317 updates the existing rules according to the newly received rule.

The rule setting unit 317 includes a dedicated virtual network IF and communicates with the network 21 and the control device 100 via the dedicated virtual network IF. The filter processing unit 316 and the rule setting unit 317 may be configured to communicate with the control device 100 via the network IF 314.

FIG. 6 is a diagram illustrating an example of a connection list table, according to a second embodiment. The connection list table 111 may be stored in the control information storage unit 110. The connection list table 111 includes fields of "user ID", "SaaS type", and "network IF". Information items that correspond to the respective fields and are arranged in each of rows are associated with each other and indicate information on one of users.

A user ID identifying a service provider operating the user site 30 is set to the user ID field. A SaaS type identifying a service to be provided is set to the SaaS type field. Identification information identifying the network IFs on the virtual machine sides of the virtual routers 310 and 310a is set to the network IF field.

Here, let a user ID of the service provider operating the user site 30 be "User1". Let a user ID of a service provider operating another user site be "User2".

Further, let a SaaS type of a service being used on the virtual machine 320 be "SaaS1". Let a SaaS type of a service being used on the virtual machine 320a be "SaaS2". Let a SaaS type of a service being used on the virtual machine 320b be "SaaS3". Let a SaaS type of a service being used on the virtual machine 320c be "SaaS4".

Further, let identification information identifying the network IF 312 be "IF-S1". Let identification information identifying the network IF 313 be "IF-S2". Let identification information identifying a network IF that is included in the virtual router 310a and connected to the virtual machine 320b be "IF-S3". Let identification information identifying a network IF that is included the virtual router 310a and connected to the virtual machine 320c be "IF-S4". In the case, the identification information identifying each of the network IFs may be, for example, an IP address on the network to which the each network IF belongs.

For example, the connection list table 111 includes information items "User1", "SaaS1", and "IF-S1" that are set in association with the respective fields of the a "user ID", "SaaS type", and "network IF1". This means that the service provider operating the user site 30 ("User1") is using the service of a SaaS type "SaaS1". Further, it is indicated that communication is performed via the network IF 312 ("IF-S1") of the virtual router 310 in order to provide the relevant service.

FIG. 7 is a diagram illustrating an example of a filter template table, according to a second embodiment. Each of filter template tables 112, 112a, and so forth defines a template of filter rules (called a filter template hereinafter) in association with each of SaaS types, and stored in the control information storage unit 110. Filters provided between the networks on the virtual machine side and on the user side are defined in the filter template tables 112, 112*a* and so forth. Filter templates associated with the SaaS type "SaaS1" are defined in the filter template table 112. Filter templates associated with the SaaS type "SaaS2" are defined in the filter template table 112*a*. Here, description will be given of the filter template table 112 as an exemplary filter template table, and the filter template tables 112*a* and so forth may be similarly explained.

The filter template table 112 includes data entries each including fields of "From port", "To port", "Protocol", "From-IF", "To-IF", and "Permit/deny". Each of the data entries indicates one filter template and is represented by a row in the filter template table 112 as depicted in FIG. 7.

A port number of a sender is set to the "From port" field. A port number of a destination is set to the "To port" field. A protocol type is set to the "Protocol" field. Identification information identifying a network IF connected with the network on the user side is set to the "From-IF" field. Identification information identifying a network IF connected with the network on the virtual machine side is set to the "To-IF" field. Information on whether communication is permitted or denied is set to the "Permit/deny" field.

The filter template table 112 includes, for example, a data entry storing "80", "*", "TCP", "<Local>", "<User>", and "Permit" in the "From port", "To port", "Protocol", "From-IF", "To-IF", and "Permit/deny" fields, respectively. This means that TCP-based (HTTP (Hypertext Transfer Protocol)-based) communication performed from the network on the virtual machine side to the network on the user side via No. 80 port is permitted.

Further, for example, the filter template table 112 includes a data entry that stores "*", "80", "TCP", "<User>", "<Local>", and "Permit" in the "From port", "To port", "Protocol", "From-IF", "To-IF", and "Permit/deny" fields, respectively. This means that TCP-based (HTTP-based) communication performed from the network on the user side to the network on the virtual machine side via No. 80 port is permitted.

Further, for example, the filter template table 112 includes a data entry that stores "*", "*", "TCP", "<Local>", "<User>", and "Deny" in the "From port", "To port", "Protocol", "From-IF", "To-IF" and "Permit/deny" fields, respectively. This means that communication from the network on the virtual machine side to the network on the user side is denied to anybody.

Further, for example, the filter template table 112 includes a data entry that stores "*", "*", "TCP", "<User>", "<Local>", and "Deny" in the "From port", "To port", "Protocol", "From-IF", "To-IF", and "Permit/deny" fields, respectively. This means that communication from the network on the user side to the network on the virtual machine side is denied to anybody.

In the filter template table 112, a filter rule defined in a higher row is given a higher priority. That is, the filter template table 112 indicates that bidirectional HTTP-based communication is permitted between the networks on the user side and on the virtual machine side, and that other communications are entirely cut off.

When a virtual router acquires a filter template defined in the filter template table 112, the virtual router generates a dedicated filter rule for the virtual router by applying identification information identifying one of the network IFs of the virtual router to the obtained filter template. For example, the virtual router applies identification information identifying a network IF connected with a virtual machine that provides a service of the SaaS type "SaaS1" to the fields marked with "<Local>" in the obtained filter template. Further, the virtual router applies identification information identifying a network IF connected with the network on the user side to the field marked with "<User>" in the obtained filter template.

Next, description will be given of exemplary filter rules (a filter table) that are generated for the virtual machine 320 in the above mentioned way.

FIG. 8 is a diagram illustrating an example of a filter table, according to a second embodiment. A filter table 311*a* is stored in the rule storage unit 311. In the case, the filter table 311*a* indicates an exemplary case in which the virtual router 310 has acquired a filter template defined in the filter template table 112. The filter table 311*a* is provided with "From port", "To port", "Protocol", "From-IF", "To-IF" and "Permit/deny" fields. In the filter table 311*a*, a row indicates one filter rule and stores pieces of information in the respective fields of the row, for example, as depicted in each of rows in the filter table 311*a* of FIG. 8. Here, information items entered in the respective fields are same as those entered in the filter template table 112 explained with reference to FIG. 7 except for the differences below.

The filter table 311*a* and the filter template table 112 differ in information items that are set in the "From-IF" field and the "To-IF" field. The information item marked with "<Local>" in the filter template table 112 is replaced in the filter table 311*a* with the identification information "IF-S1" identifying the network IF 312 connected to the virtual machine 320. Further, the information item marked with "<User>" in the filter template table 112 is replaced with identification information "IF-U1" identifying the network IF 314.

The filter processing unit 316 of the virtual router 310 refers to the filter table 311*a* and performs a filtering operation.

Next, description will be given of a procedure for data processing performed by the data processing system that is configured as described above.

Figure 9:
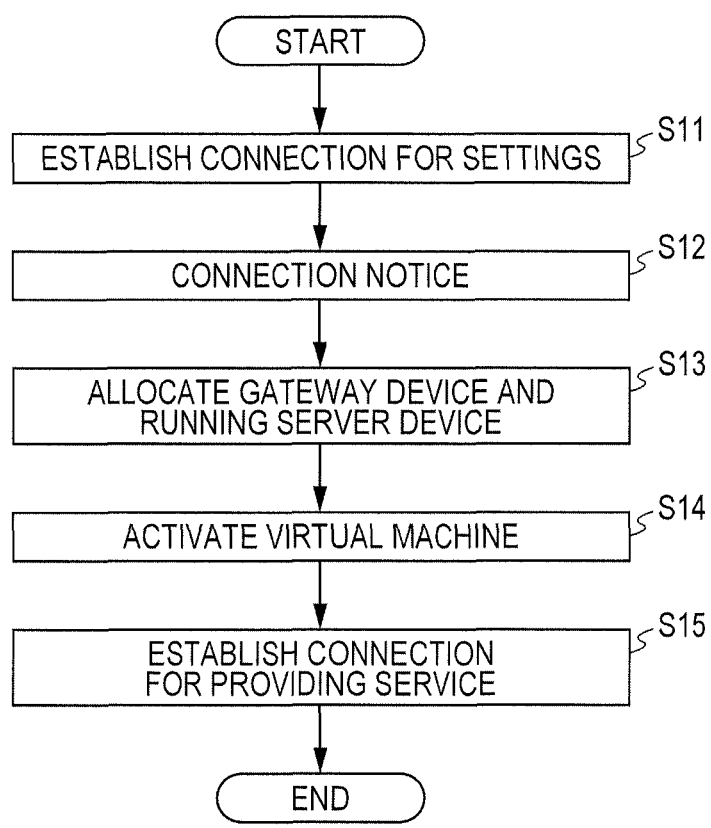
FIG. 9 is a diagram illustrating an example of an operational flowchart for activating a virtual machine, according to a second embodiment.

FIG. 9 is a diagram illustrating an example of an operational flowchart for activating a virtual machine, according to a second embodiment. The operational flowchart indicated in FIG. 9 will be explained below in the order of operation numbers.

In operation S11, when the router device 500 is physically connected to the network 10, for example, a WAN (Wide Area Network) port is connected to a network line, the communication processing unit 510 of the router device 500 establishes a connection with the network 10 according to the predetermined connection information. Further, for the purpose of initial settings, the communication processing unit 510 establishes an IP-VPN connection with the gateway device 400 according to the predetermined connection information. The predetermined connection information includes, for example, an ID and a password for a PPPoE-based connection with the network 10, and information on an IP-VPN group. For example, the predetermined connection information may be recorded on a memory provided for the router device 500 at the time of the factory shipment. The gateway device 400 may be configured so that at least one PPPoE connection to the network 10 is kept established all the time for the purpose of initial settings.

In operation S12, the communication processing unit 510 of the router device 500 inform the control device 100 of a connection notice. The connection notice includes information on the virtual machine to be activated (which specifies, for example, an OS type, CPU performance, storage capacities of a memory, an HDD) and identification information identifying a user. The information on the virtual machine may be recorded on a memory provided for the router device 500, for example, at the time of the factory shipment of the router device 500. The communication processing unit 510 may use, for example, an HTTP-based request as the connection notice. For example, the communication processing unit 510 uses an HTTP-based PUT request specifying a URL (Uniform Resource Locator) of the control device 100 so as to give a connection notice including the information on the virtual machine to be activated. The connection control unit 120 of the control device 100 receives the connection notice from the router device 500. The connection control unit 120 has, for example, a function of a Web server and receives the connection notice that has been sent from the router device 500 as an HTTP-based request.

In operation S13, the connection control unit 120 requests the start control unit 220 to allocate a gateway device for establishing a connection to be used for providing a service. Further, the connection control unit 120 requests the start control unit 220 to allocate a running server device that meets requirements of the virtual machine designated by the connection notice. The start control unit 220 allocates a gateway device and a running server device to the user by referring to the management data storage unit 210. For example, when it is assumed that the start control unit 220 allocates the gateway device 400 and the running server device 300 to the user, the connection control unit 120 establishes an IP-VPN connection between the gateway device 400 and the router device 500.

In operation S14, the start control unit 220 causes the running server device 300 to activate the virtual machine 320 and the virtual router 310 that relays communication performed by the virtual machine 320. Upon checking with the running server device 300 that the virtual router 310 and the virtual machine 320 have been activated, the start control unit 220 notifies the connection control unit 120 of the result of the checking. Then, the activated virtual router 310 and the activated virtual machine 320 are allocated to the user.

In operation S15, the connection control unit 120 establishes an L2VPN connection between the router device 500 and the virtual router 310 that has been activated in operation S14. After establishing the L2VPN connection, the connection control unit 120 disconnects the IP-VPN connection that has been set between the gateway device 400 and the router device 500 for the purpose of initial settings. Further, the connection control unit 120 disconnects the PPPoE connection that has been set between the router device 500 and the network 10 for the purpose of initial settings.

Next, how the devices are related to each other in the operations described above will be explained with reference to a sequence chart.

FIG. 10 is a diagram illustrating an example of an operational sequence for activating a virtual machine, according to a second embodiment. The operational sequence will be explained below in the order of operation numbers depicted in FIG. 10.

In operation ST101, the router device 500 is connected to the network 10. Then, the router device 500 makes a PPPoE-based certification using a predetermined ID and password and connects with a PPPoE-based network. Further, the router device 500 establishes an IP-VPN connection with the gateway device 400 according to predetermined information on a IP-VPN group.

In operation ST102, the router device 500 sends a connection notice to the control device 100. The connection notice includes information on a virtual machine to be activated and a user ID.

In operation ST103, the router device 500 requests the virtual machine management device 200 to allocate a running server device and a gateway device to the user.

In operation ST104, when allocation of the running server device 300 and the gateway device 400 has finished, the virtual machine management device 200 notifies the control device 100 of the result of the allocation.

In operation ST105, the control device 100 obtains, from the communication service provider server device 700, two sets of connection information each including information on the PPPoE connection for IP-VPN (ID and password) and information on connections in the IP-VPN group. The control device 100 sends one of the two sets of information to the router device 500.

In operation ST106, the control device 100 sends, to the gateway device 400, the other one of the two sets of connection information regarding the PPPoE connection and the connections in the IP-VPN group.

In operation ST107, the router device 500 and the gateway device 400 establish an IP-VPN connection according to the connection information (regarding the PPPoE connection and the connections in the IP-VPN group) received from the control device 100.

In operation ST108, the control device 100 sends a instruction to activate the virtual machine and the virtual router (an activation instruction) to the virtual machine management device 200.

In operation ST109, the virtual machine management device 200 instructs the allocated running server device 300 to activate the virtual router 310 and the virtual machine 320.

In operation ST110, after completing activation of the virtual router 310 and the virtual machine 320, the running server device 300 notifies the control device 200 of the completion of activation of the virtual router 310 and the virtual machine 320 (activation completion notice).

In operation ST111, the virtual machine management device 200 notifies the control device 100 that the virtual router 310 and the virtual machine 320 have been activated on the running server device 300 (activation completion notice).

In operation ST112, the control device 100 establishes an L2VPN connection between the virtual router 310 and the router device 500. For example, the control device 100 sends an IP address of the virtual router 310 to the router device 500, and instructs the router device 500 to make a setting for encapsulating an Ethernet frame destined for the IP address of the virtual router 310 on an EtherIP basis. Further, the control device 100 sends an IP address of the router device 500 to the virtual router 310, and instructs the virtual router 310 to make a setting for encapsulating an Ethernet frame destined for the IP address of the router device 500 on an EtherIP basis. After the L2VPN connection is established, the control device 100 disconnects the IP-VPN connection and the PPPoE connection that have been established for the purpose of initial settings at operation ST101.

As mentioned above, the control device 100 receives a connection notice from the router device 500 using the IP-VPN connection that is established between the router device 500 and the gateway device 400 for the purpose of initial settings. Then, the control device 100 obtains, from the communication service provider server device 700, information for an IP-VPN connection to be used for actual operations, and establishes the IP-VPN connection between the router device 500 and the gateway device 400. After the virtual router 310 is activated, the control device 100 establishes an L2VPN connection between the virtual router 310 and the router device 500.

In the operational sequence of FIG. 10, it is also possible to perform operations ST105 to ST107 and operations ST108 to ST111 in parallel.

FIG. 11 is a diagram illustrating an example of an operational flowchart for setting a filter, according to a second embodiment. The operations depicted in FIG. 11 will be explained below in order of operation numbers.

In operation S21, the connection control unit 120 receives, from the router device 500, service selection information identifying a service selected by the user. The connection control unit 120 sends the received service selection information identifying the service selected by the user to the rule managing unit 130 and the start control unit 220. Here, the service selection information includes information identifying the virtual machine allocated to the user and the SaaS type of the selected service. For example, information identifying the virtual machine 320 and the SaaS type "SaaS1" are included in the service selection information.

In operation S22, the rule managing unit 130 selects a filter template corresponding to the SaaS type of the selected service by referring to the control information storage unit 110. In the case, since the SaaS type of the selected service is "SaaS1", the rule managing unit 130 selects the filter template table 112 corresponding to SaaS type "SaaS1".

In operation S23, the rule managing unit 130 selects a virtual router that relays communication performed by the identified virtual machine. For example, when the virtual machine 320 is identified, the rule managing unit 130 selects the virtual router 310. The rule managing unit 130 may inquire the start control unit 220 about information on a network IF coupled to the virtual machine 320 and information on a virtual router corresponding to the virtual machine 320.

In operation S24, the rule managing unit 130 sends the filter template selected in operation S22 to the virtual router 310. At the same time, the rule managing unit 130 informs the virtual router 310 of information on the network IF 312 ("IF-S1") coupled to the virtual machine 320 that provides a service of the SaaS type "SaaS1". The information on the network IF 312 is used for setting a information item marked with "<Local>" in the template.

In operation S25, upon receiving the filter template, the rule setting unit 317 of the virtual router 310 replaces the character strings "<Local>" written in the "From-IF" and "To-IF" fields in the filter template with "IF-S1" indicating the network IF 312. Further, the rule setting unit 317 replaces the character strings "<User>" written in the relevant respective fields with "IF-U1" indicating the network IF 314 coupled to the network on the user side. The rule setting unit 317 sets the filter rule generated in this way to the filter table 311a in the rule storage unit 311.

In operation S26, the rule setting unit 317 notifies the rule managing unit 130 of notice indicating completion of setting the filter rule. The rule managing unit 130 accepts the completion of setting the filter rule by receiving the notice.

In operation S27, the rule managing unit 130 updates the connection list table 111 stored in the control information storage unit 110. That is, the rule managing unit 130 sets a correspondence relation among a user, the SaaS type of a service newly selected by the user, and a network IF used by the user. For example, the rule managing unit 130 sets the correspondence relation among the user "User1", the SaaS type "SaaS1", and the network IF "IF-S1" to the connection list table 111, based on the result of the above mentioned operations S21-S26.

As mentioned above, the rule managing unit 130 selects a filter rule corresponding to the SaaS type of the selected service, and sends the selected filter rule to the virtual router 310.

Next, for the operations described above, operational relations among the devices will be explained with reference to a sequence chart.

FIG. 12 is a diagram illustrating an example of an operational sequence for setting a filter, according to a second embodiment. The operational sequence depicted in FIG. 12 will be explained below in the order of operation numbers.

In operation ST121, the client device 600 accepts service selection information identifying a service selected by a user ("User1"). The service selection information includes information identifying the virtual machine 320 designated by the user and SaaS type "SaaS1" of the selected service. The client device 600 inputs the service selection information into the router device 500. The router device 500 sends the service selection information to the control device 100 via the gateway device 400.

In operation ST122, the control device 100 extracts a filter template table 112 corresponding to the SaaS type "SaaS1" of the selected service from the control information storage unit 110. The control device 100 sends a filter template (rule) stored in the extracted filter template table 112 to the virtual router 310 on the running server device 300.

In operation ST123, the virtual router 310 generates a filter rule by applying information identifying the network IF of the virtual router 310 to the received filter template, and sets the generated filter rule to the filter table 311a in the rule storage unit 311. The virtual router 310 notifies the control device 100 of completion of setting the filter rule. The virtual router 310 starts a filtering operation according to the generated filter rule.

In operation ST124, the control device 100 notifies the virtual machine management device 200 of the service selection information including information identifying the virtual machine 320 designated by the user. The virtual machine management device 200 instructs the virtual machine 320 on the running server device 300 to execute a software program for providing the service selected by the user, based on the service selection information notified from the control device 100.

In operation ST125, the control device 100 sets information on a correspondence relation among the user "User1", the SaaS type "SaaS1", and the network IF "IF-S1", to the connection list table 111 in the control information storage unit 110.

In operation ST126, the client device 600 accepts a manipulation done by the user and sends a request for data processing to a software program that is executed by the virtual machine 320 on the running server device 300. This allows the user to utilize a service implemented using the software program.

In this way, the control device 100 sends the filter rule corresponding to a service selected by the user to the virtual router 310, thereby allowing a communication monitoring rule to be easily set.

For example, when a service provided using the virtual machine 320 is selected by the user, a service monitoring rule for the selected service may be easily set to the virtual router 310, by sending a filter template defined for each of services to the virtual router 310 that relays communication performed by the virtual machine 320. Even when a plurality of virtual machines work on a plurality of data processing devices, a communication monitoring rule for a service selected for each of the virtual machines is automatically obtained, and the obtained communication monitoring rule is sent to a virtual router corresponding to the each virtual machine. Thus, the system administrator may reduce the workload needed for setting the communication monitoring rules.

Further, from a viewpoint of security, it is preferable to set a filter rule to the virtual router 310 before the service is made available. That is, for example, the virtual machine management device 200 instructs the virtual machine 320 to execute the software program in operation ST124 after completion of setting the filter rule. This is because it is difficult for the virtual router 310 to suitably filter communication needed for providing the service before the filter rule is set. In this way, the user may start to use the service on the condition that safety for communication needed for providing the service is kept in advance. In the example of FIG. 12, it is also possible to perform operation ST124 before operation ST122.

In a data processing system according to the second embodiment, the network 31 in the user site 30 is connected to the virtual machines 320, 320a, and 320b on a VPN basis. Thus, these virtual machines are in the form of being connected to an extension of the network 31 (intranet). A problem arising from that case is how a security for communication is maintained. For example, when a user is in charge of settings, the user is required to be familiar with filter settings. Meanwhile, when the service provider is in charge of settings in data processing system in which lots of virtual machines work, the problem lies in the workload needed for the settings. Meanwhile, when the control device 100 sends a filter template corresponding to the selected service to the virtual router as described above, workloads imposed on both user and service provider sides may be reduced and the security for communication may be easily maintained.

The filter template tables 112, 112a and so forth of the second embodiment indicate exemplary filter rules to be applied between the network on the virtual machine side and the network on the user side. The filter rules may enhance the security for communication between these networks.

Further, the user may conceivably stop using the service. In the case, the user may do an operation for that case, for example, using an interface provided by the router device 500. When that is the case, the control device 100 notifies the virtual machine management device 200 and the virtual router relaying communication of the virtual machine providing the service, of information indicating that stop of using the service is accepted. Then, the virtual router removes the filter rule corresponding to the service. For example, when the user stops using the service of the SaaS type "SaaS1", the virtual router removes, in the filter table 311a, a record in which "IF-S1" is set to the "From-IF" field.

(Third Embodiment)

Next, a third embodiment will be explained. What is different from the second embodiment described above will primarily be explained, and the explanation of similar matters will be omitted here.

The second embodiment provided an exemplary setting of a filter rule to be applied between a network on the virtual machine side and a network on the user side. In some cases, a virtual machine may communicate with another virtual machine allocated to the relevant user so that the service is made available on the virtual machine. In that case, it is preferable to do a filtering operation for the inter-virtual machine communication. The third embodiment provides a method for enabling a filter rule to be easily set between a plurality of virtual machines.

Here, it is assumed that a data processing system of the third embodiment has a configuration similar to that of the data processing system of the second embodiment explained illustrated in FIG. 2. In the third embodiment, devices and the components of the devices are each referred to by a reference numeral or a name that is same as that of the corresponding one of the second embodiment.

FIG. 13 is a diagram illustrating an example of a filter template table, according to a third embodiment. The filter template tables 113, 113a and so forth each define a filter template to be applied between a virtual machine that provides a service of a given SaaS type and another virtual machine that provodes another service with which the service of the given SaaS type cooperates. That is, the filter template tables 113, 113a and so forth define filters that are used within the network on the virtual machine side. The filter template tables 113, 113a and so forth may be stored in the control information storage unit 110.

The filter template table 113 defines a filter template that is used for cooperation between the SaaS type "SaaS1" and a SaaS type different from the "SaaS1". The filter template table 113a defines a filter template that is used for cooperation between the SaaS type "SaaS2" and a SaaS type different from "SaaS2". The filter template table 113 will be explained below as an exemplary filter template table, and descriptions of the filter template tables 113a and so forth will be omitted here because they are similarly explained.

The filter template table 113 includes fields of "From port", "To port", "Protocol", "From-IF", "To-IF", "Flag", and "Permit/deny". Information items that correspond to the respective fields and are arranged in each of rows are associated with each other and indicate one filter template. Each of the information items except for one corresponding to the "Flag" field is the same as that in the filter template table 112 of the second embodiment explained illustrated in FIG. 7.

For example, an information item for limiting a direction of TCP-based call request may be set to the "Flag" field.

The filter template table 113, for example, includes information items "*", "*", "TCP", "<Local>", "<SaaS>", "NEW, Established", and "Permit" that are set in association with the respective fields of the "From port", "To port", "Protocol", "From-IF", "To-IF", "Flag", and "Permit/deny". This means that the virtual router partially permits TCP-based communication from the network IF of the SaaS type "SaaS1" to a network IF connected to a virtual machine that provides a service of a SaaS type different from "SaaS1". Here, the permitted TCP-based communication is communication of a packet for establishing a new TCP session ("NEW") and communication of a packet in a TCP session that has been established ("Established").

Further, the filter template table 113 includes, for example, information items "*", "*", "TCP", "<SaaS>", "<Local>", "Established", and "Permit" that are set in association with the respective fields of the "From port", "To port", "Protocol", "From-IF", "To-IF", "Flag", and "Permit/deny". This means that the virtual router partially permits TCP-based communication from a network IF connected with a virtual machine that provides a service of a SaaS type different from "SaaS1" to a network IF connected to a virtual machine that provides a service of the SaaS type "SaaS1". Here, the permitted TCP-based communication is communication of a packet in a TCP session that has been established.

Further, the filter template table 113 includes, for example, information items "*", "*", "TCP", "<Local>", "<SaaS>", "-", and "Deny" that are set in association with the respective fields of "From port", "To port", "Protocol", "From-IF", "To-IF", "Flag", and "Permit/deny" fields. This means that the virtual router entirely cuts off communication from a network IF connected with a virtual machine that provides a service of the SaaS type "SaaS1" to a network IF connected with a virtual machine that provides a service of a SaaS type different from "SaaS1".

Further, the filter template table 113 includes, for example, information items "*", "*", "TCP", "<SaaS>", "<Local>", "-", and "Deny" that are set in association with the respective fields of the "From port", "To port", "Protocol", "From-IF", "To-IF", "Flag", and "Permit/deny". This means that the virtual router entirely cuts off communication from a network IF connected to a virtual machine that provides a service of a SaaS type different from "SaaS1" to a network IF connected to a virtual machine that provides a service of the SaaS type "SaaS1".

Each of the rules is given a higher priority as the each rule is written on a higher row in the filter template table 113. According to the filter template table 113, a TCP session is allowed to be opened from a network IF coupled to a virtual machine that provides a service of the SaaS type "SaaS1" to a network IF coupled to a virtual machine that provides a service of a SaaS type different from "SaaS1". Here, a TCP session is prohibited from being opened in the opposite direction (from the network IF of a SaaS type different from "SaaS1" to the network IF of the SaaS type "SaaS1"). Afterwards, communication is permitted on the TCP session opened between the both virtual machines, and communications other than the above is entirely cut off.

A virtual router that has obtained a filter template defined in the filter template table 113 generates a filter rule for the virtual router by applying identification information identifying the network IF provided for the virtual router to the obtained filter template. For example, the virtual router applies, to "<Local>", identification information identifying the network IF coupled to the virtual machine that provides the service of the SaaS type "SaaS1". The virtual router applies, to "<SaaS>", identification information identifying the network IF coupled to the virtual machine that provides the service of a SaaS type different from "SaaS1".

Next, description will be given of an exemplary filter rule (filter table) that is generated for the virtual machine 320 in the manner mentioned above.

FIG. 14 is a diagram illustrating an example of a filter table, according to a third embodiment. A filter table 311b is stored in the rule storage unit 311. The filter table 311b indicates an exemplary case in which the filter templates defined in the filter template tables 113 and 113a are additionally set to the filter table 311a. Here, information items that have been depicted in the filter table 311a are omitted. The filter table 311b is provided with "From port", "To port", "Protocol", "From-IF", "To-IF", "Flag", and "Permit/deny" fields. Information items that correspond to the respective fields and are arranged in each of rows are associated with each other and indicate one filter rule. The meanings of the respective fields are the same as those in the filter template table 113 explained with reference to FIG. 13.

The filter table 311b differs from the filter template tables 113, 113a and so forth, in values that are set as the information items associated with the "From-IF" field and the "To-IF" field. The filter table 311b indicates values of information items set as setting A and values of information items set as setting B. The setting A are filter rules that are used for communication performed between the virtual machines 320, 320a and defined based on the filter template table 113. The setting B are filter rules that are used for communication performed between the virtual machines 320, 320a and defined based on the filter template table 113a.

In the setting A, an information item marked with "<Local>" in the filter template table 113 is replaced with the identification information "IF-S1" identifying the network IF 312 coupled to the virtual machine 320 that provides the service of the SaaS type "SaaS1". Further, an information item marked with "<SaaS>" in the filter template table 113 is replaced, in the filter table 311b, with the identification information "IF-S2" identifying the network IF 313 coupled to the virtual machine 320a that provides the service of the SaaS type "SaaS2" (different from SaaS type "SaaS1").

In the setting B, an information item marked with "<Local>" in the filter template table 113a is replaced with the identification information "IF-S2" identifying the network IF 313 coupled to the virtual machine 320a that provides the service of the SaaS type "SaaS2". Further, an information item marked with "<SaaS>" in the filter template table 113a is replaced, in the filter table 311b, with the identification information "IF-S1" identifying the network IF 312 coupled to the virtual machine 320 that provides the service of the SaaS type "SaaS1" (different from SaaS type "SaaS2").

In the filter template table 113a, a rule is set for each of all the combinations between a first network IF coupled to a virtual machine that provides a service of a SaaS type selected by a user and a second network IF coupled to another virtual machine allocated to the use.

For example, the user "User1" uses a service of the SaaS type "SaaS3" provided by the virtual machine 320b in the running server 300a. Thus, a filter rule for communication performed between the virtual machines 320 and 320b is set in the filter table 311b on the basis of the filter template table 113. Further, a filter rule for communication performed between the virtual machines 320a and 320b is set in the filter table 311b on the basis of the filter template table 113a. In this way, filter rules are comprehensively set between a plurality of virtual machines allocated to the user.

Next, a procedure for data processing performed by the data processing system configured as described above will be explained. The process for activating the virtual machine is the same as the process for activating the virtual machine of the second embodiment explained with reference to FIG. 9.

Figure 15:
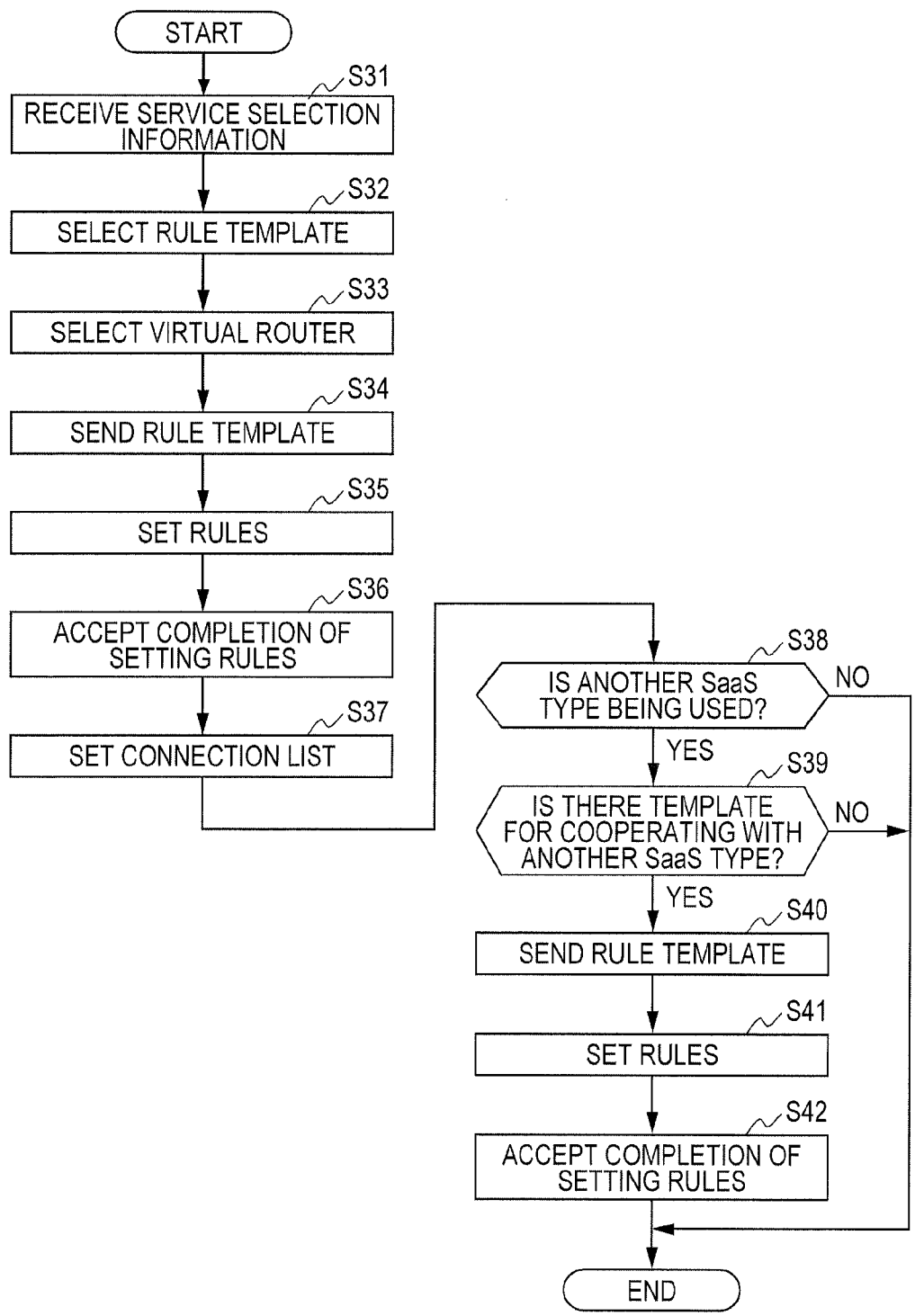
FIG. 15 is a diagram illustrating an example of an operational flowchart for setting a filter, according to a third embodiment.

FIG. 15 is a diagram illustrating an example of an operational flowchart for setting a filter, according to a third embodiment. The operations depicted in FIG. 15 will be explained below in the order of operation numbers.

In operation S31, the connection control unit 120 receives, from the router device 500, service selection information identifying a service selected by a user. The connection control unit 120 sends the service selection information of the user to the rule managing unit 130 and the start control unit 220. The service selection information includes information identifying the virtual machine allocated to the user and the SaaS type of the selected service. Here, for example, it is assumed that the service selection information includes information identifying the virtual machine 320 and the SaaS type "SaaS1".

In operation S32, the rule managing unit 130 selects a filter template corresponding to the SaaS type of the selected service, by referring to the control information storage unit 110. In the case, the rule managing unit 130 selects the filter template table 113 since the SaaS type of the selected service is "SaaS1".

In operation S33, the rule managing unit 130 selects a virtual router that relays communication of the designated virtual machine. When the virtual machine 320 is designated, the rule managing unit 130 selects the virtual router 310. The rule managing unit 130 may inquire the start control unit 220 about a network IF coupled to the virtual machine 320 and the virtual router corresponding to the virtual machine 320.

In operation S34, the rule managing unit 130 sends the filter template that has been selected in operation S32 to the virtual router 310. At the same time, the rule managing unit 130 informs the virtual router 310 of information ("IF-S1") identifying the network IF 312 that is coupled to the virtual machine 320 on which a service of the SaaS type "SaaS1" is available. Here, the information identifying the network IF 312 corresponds to a value to be set to the information item marked with "<Local>" in the filter template.

In operation S35, the rule setting unit 317 receives the filter template. The rule setting unit 317 replaces a value (for example, character strings) of "<Local>" written as the information item associated with "From-IF" and "To-IF" fields in the filter template, with a value of "IF-S1" identifying the network IF 312. Further, the rule setting unit 317 replaces the character strings of "<User>" written as the information item associated with the relevant respective fields, with a value of "IF-U1" identifying the network IF 314 coupled to the network on the user side. The rule setting unit 317 sets the filter rule generated in this way to the filter table 311b stored in the rule storage unit 311.

In operation S36, the rule setting unit 317 notifies the rule managing unit 130 of notice indicating completion of setting the filter rules. The rule managing unit 130 accepts the notice indicating the completion of setting the filter rules.

In operation S37, the rule managing unit 130 updates the connection list table 111 stored in the control information storage unit 110. In the case, the rule managing unit 130 sets a relationship among a user, a SaaS type of the service selected by the user, and the network IF used by the user. For example, based on the result of operations S31-S36, the rule managing unit 130 sets a relationship among the user "User1", the SaaS type "SaaS1", and the network IF "IF-S1" to the connection list table 111.

In operation S38, the rule managing unit 130 determines whether the user is using a service of a SaaS type different from that of the service selected by the user. When the user is using a service of the different SaaS type, the processing is shifted to operation S39, and otherwise the processing is terminated. Here, the rule managing unit 130 may determine whether there is a different SaaS type corresponding to the user by referring to the connection list table 111. When there is a different SaaS type in the connection list table 111, the user is using a service of the different SaaS type, and otherwise the user is not using a service of the different SaaS type. For example, in the connection list table 111, the SaaS types "SaaS2" and "SaaS3" are associated with the "User1" in addition to "SaaS1". Thus, the user "User1" is using services of different SaaS types other than the SaaS type "SaaS1".

In operation S39, the rule managing unit 130 determines whether there is a filter template to be applied between the SaaS type selected in operation S31 and another SaaS type, by referring to the control information storage unit 110. When there is a filter template to be applied between the selected SaaS type and another SaaS type, the processing shifts to operation S40, and otherwise the processing is terminated. In the case, the control information storage unit 110 includes the filter template table 113 in which a filter template for connecting "SaaS1" to a different SaaS is defined. Thus, the rule managing unit 130 determines that there is a filter template to be applied between the SaaS type "SaaS1" selected in operation S31 and a different SaaS type.

In operation S40, the rule managing unit 130 sends a filter template stored in the filter template table 113 to the virtual router 310 selected in operation S33. At the same time, the rule managing unit 130 informs the virtual router 310 of information ("IF-S1") identifying the network IF 312 coupled to the virtual machine 320 providing a service of the SaaS type "SaaS1". The information identifying the network IF 312 is used for setting the information item marked with "<Local>" in the template. Further, the rule managing unit 130 sends two pieces of information ("IF-S2" and "IF-S3") identifying the network IFs coupled to the virtual machines 320a and 320b that provide services of different SaaS types "SaaS2" and "SaaS3", respectively, to the virtual router 310. The two pieces of information identifying the network IFs are used for setting information items marked with "<SaaS>" in the template.

In operation S41, the rule setting unit 317 of the virtual router 310 receives the filter template. The rule setting unit 317 generates a filter rule for each of all the combinations of the information items marked with "<Local>" and "<SaaS>" which are received from the rule managing unit 130. For example, the rule setting unit 317 receives value "IF-S1" that is to be set as the information item marked with "<Local>" together with the filter template. Further, the rule setting unit 317 receives values "IF-S2" and "IF-S3" that are to be set as the information item marked with "<SaaS>". Thus, two combinations (IF-S1, IF-S2) and (IF-S1, IF-S3) are obtained as the combination of the information items marked with "<Local>" and "<SaaS>". The rule setting unit 317 generates a filter rule in which the information items marked with "<Local>" and "<SaaS>" in the filter template table 113 are set at values "IF-S1" and "IF-S2", respectively, so as to set the filter rule to the filter table 311b. The rule setting unit 317 similarly generates a filter rule in which the information items marked with "<Local>" and "<SaaS>" in the filter template table 113 are set at values "IF-S1" and "IF-S3", respectively, so as to set the filter rule to the filter table 311b.

In operation S42, the rule setting unit 317 notifies the rule managing unit 130 of notice indicating completion of setting the filter rule between the virtual machines. The rule managing unit 130 accepts the completion of setting the filter rule according to the notice.

As mentioned above, the rule managing unit 130 sends a filter template for filtering communication performed between the virtual machines to the virtual router 310. Upon receiving the filter template, the virtual router 310 generates a filter rule for each of combinations between a SaaS type selected by a user (for example, "SaaS1") and another SaaS type being used by the user (for example, "SaaS2" or "SaaS3") on the basis of the filter template.

In this way, an effect similar to that of the second embodiment is obtained. Further, this allows a filter rule to be easily set between a service selected by a user and another service. This is particularly effective in a case where the user is using lots of services.

It is also possible to make the selected virtual machine run a software program for using the service after a filter rule is set between the selected service and another service. This allows starting provision of the selected service while maintaining security for communication with another service by means of a filter.

In the above example, a service of the SaaS type "SaaS1" is selected. When the user selects a service of "SaaS2" while using "SaaS1" and "SaaS3", settings for a combination between "SaaS2" and "SaaS1" and a combination between "SaaS2" and "SaaS3" may be performed, in a similar manner, in the filter table 311b.

Further, the user may conceivably stop using the service. In the case, the user may do a manipulation for that using, for example, an interface provided by the router device 500. When that is the case, the control device 100 notifies the virtual machine management device 200 and a virtual router relaying communication performed by the virtual machine providing the service, that the stop of the service is accepted. Then, the virtual router removes the filter rule corresponding to the service. For example, when the user stops using the service of the SaaS type "SaaS1", the virtual router removes a record in which value "IF-S1" is set to the "From-IF" field in the filter table 311*b*.

Further, according to the second and third embodiments, it is assumed that a filter template is sent to the virtual router when a selection of a service is accepted so that the virtual router monitors communication according to a filter rule generated based on the filter template. However, the rule to be sent is not limited to a filter rule. A template of a rule for detecting illegal access (sometimes called a signature or an anomaly) to be used for systems such as IDS (Intrusion Detection System) or IPS (Intrusion Prevention System) may be defined for each of services. In this case, character strings such as "<Local>", "<User>" or "<SaaS>" may be set to portions that indicate a destination (To-IF) or a sender (From-IF) of communication in the template, in a manner similar to the filter template tables 112 and 113. When a service is selected, a template of the rule is sent to a virtual machine that executes a software program for providing the service so that the virtual machine replaces each of the character strings with identification information identifying a network IF of each of virtual machines. This allows the rule for detecting illegal access for each of services to be easily set to the virtual router in a manner similar to the filter rule.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An apparatus for monitoring communication performed by a virtual machine, the apparatus comprising:
a memory to store, in association with each of one or more services, a communication monitoring rule under which communication performed for providing the each of the one or more services is to be monitored; and
a processor to:
communicate with another apparatus that is configured to run a first virtual machine and run a virtual router relaying the communication performed by the first virtual machine, and
control, when a first service to be provided by the first virtual machine is selected from among the one or more services by a user, the virtual router to monitor communication performed by the first virtual machine according to the communication monitoring rule associated with the selected first service, by sending the communication monitoring rule to the virtual router.

2. The apparatus of claim 1, wherein
the memory is further configured to store list information, the list information storing identification information identifying a first interface that is included in the virtual router and communicably coupled to the first virtual machine, in association with the selected first service; and
the processor is configured to control the virtual router to monitor communication performed via the first interface according to the communication monitoring rule, by referring to the list information.

3. The apparatus of claim 2, wherein
the virtual router is provided with a second interface that is communicably coupled to a user-side network to which the user belongs;
the processor is configured to control the virtual router to monitor communication performed between the first and second interfaces according to the communication monitoring rule, by referring to the list information.

4. The apparatus of claim 2, wherein
the virtual router is provided with a second interface that is communicably coupled to a second virtual machine providing a second service being used by the user that has selected the first service;
the processor is configured to control the virtual router to monitor communication performed between the first and second interfaces according to the communication monitoring rule, by referring to the list information.

5. The apparatus of claim 1, wherein
the processor send the communication monitoring rule associated with the selected first service to the virtual router before the first virtual machine begins providing the selected first service.

6. A non-transitory computer readable recording medium having stored therein a program for causing a computer to execute a process comprising:
storing, in association with each of one or more services to be provided, a communication monitoring rule under which communication performed for providing the each of the one or more services is to be monitored;
communicating with an apparatus that is configured to run a virtual machine and run a virtual router relaying communication performed by the virtual machine; and
controlling, when a service to be provided by the virtual machine is selected from among the one or more services, the virtual router to monitor communication performed by the virtual machine according to the communication monitoring rule associated with the selected service, by sending the communication monitoring rule to the virtual router.

7. A method for monitoring communication performed by a virtual machine, the method comprising:
storing, in association with each of one or more services to be provided, a communication monitoring rule under which communication performed for providing the each of the one or more services is to be monitored;
communicating with an apparatus that is configured to run a virtual machine and run a virtual router relaying communication performed by the virtual machine; and
controlling, when a service to be provided by the virtual machine is selected from among the one or more services, the virtual router to monitor communication performed by the virtual machine according to the communication monitoring rule associated with the selected service, by sending the communication monitoring rule to the virtual router.

* * * * *